United States Patent
Fahey, Jr. et al.

(10) Patent No.: US 12,485,588 B2
(45) Date of Patent: Dec. 2, 2025

(54) REFORMABLE MANDREL AND METHOD OF MAKING A COMPOSITE PART USING A REFORMABLE MANDREL

(71) Applicant: The Boeing Company, Chicago, IL (US)

(72) Inventors: Richard L. Fahey, Jr., St. Louis, MO (US); Vincenzo Misuraca, Ballwin, MO (US); Reed Searcy, St. Louis, MO (US)

(73) Assignee: THE BOEING COMPANY, Arlington, VA (US)

( * ) Notice: Subject to any disclaimer, the term of this patent is extended or adjusted under 35 U.S.C. 154(b) by 92 days.

(21) Appl. No.: 17/648,366

(22) Filed: Jan. 19, 2022

(65) Prior Publication Data

US 2023/0226724 A1 Jul. 20, 2023

(51) Int. Cl.
| | |
|---|---|
| *B29C 33/50* | (2006.01) |
| *B29C 33/40* | (2006.01) |
| *B29C 70/34* | (2006.01) |
| *B29C 70/54* | (2006.01) |
| *B29L 31/30* | (2006.01) |

(52) U.S. Cl.
CPC ............ *B29C 33/505* (2013.01); *B29C 33/40* (2013.01); *B29C 70/342* (2013.01); *B29C 70/54* (2013.01); *B29L 2031/3076* (2013.01)

(58) Field of Classification Search
CPC ............ B29L 2031/3076; B29C 33/40; B29C 33/505; B29C 33/485; B29C 70/342; B29C 70/54; B29C 70/44; B29C 33/50; B21D 5/143; B65H 2301/4182; B29D 9/01; C08F 110/06; C08F 2500/15; C08F 2500/32; C08F 2500/30; C08F 2500/39
See application file for complete search history.

(56) References Cited

U.S. PATENT DOCUMENTS

| | | | |
|---|---|---|---|
| 7,422,714 B1 * | 9/2008 | Hood | B29C 53/824 264/219 |
| 7,887,734 B2 * | 2/2011 | Sanderson | B29C 70/003 264/313 |
| 8,101,035 B2 | 1/2012 | Stenard | |
| 8,534,339 B2 * | 9/2013 | Pham | B29D 99/0007 156/500 |
| 10,286,577 B2 * | 5/2019 | Robins | B29D 99/0014 |
| 2010/0230859 A1 * | 9/2010 | Sanderson | B29C 70/30 264/294 |
| 2012/0286457 A1 * | 11/2012 | Everhart | B29C 53/824 264/531 |
| 2014/0265043 A1 * | 9/2014 | Oldroyd | B29D 99/0089 425/162 |
| 2016/0023407 A1 * | 1/2016 | Pham | B29C 70/34 156/196 |
| 2021/0308967 A1 * | 10/2021 | Thai | B29C 70/46 |

* cited by examiner

*Primary Examiner* — Farah Taufiq
(74) *Attorney, Agent, or Firm* — MH2 Technology Law Group LLP

(57) ABSTRACT

A method for making a composite part using a reformable mandrel, including contouring a reformable mandrel; placing an uncured composite part on the reformable mandrel; curing the uncured composite part; and removing the reformable mandrel, wherein the reformable mandrel includes a core including a transitional state material having a transition temperature, and a sleeve at least partially surrounding the core and including a heat-resistant flexible material having an operational temperature.

20 Claims, 11 Drawing Sheets

REFORMABLE MANDREL AND METHOD OF MAKING A COMPOSITE PART USING A REFORMABLE MANDREL

U.S. GOVERNMENT RIGHTS

This invention was made with Government support under 18-D-0107-19F1003 awarded by the Department of Defense. The government has certain rights in this invention.

TECHNICAL FIELD

The present disclosure generally relates to mandrels for fabrication of composite parts, and more particularly, to reformable mandrels and methods of making composite parts using a reformable mandrel.

BACKGROUND

Composite materials and parts, including resin-infused carbon-fiber laminates, are commonly used in applications requiring high strength and light weight. For example, in the aerospace industry, composite structures and parts are used in increasing quantities to form stiffened skin structures, horizontal stabilizers, stringers, and other aircraft components.

Mandrels are commonly used for layup of composite materials and to shape composite materials, such as hat stringers. However, complex or contoured shapes often require either placing the composite materials on a flexible mandrel and then draping the composite materials and the mandrel on a curved mold to shape them, which can cause wrinkles, defects, and high inspection costs, or creating specifically contoured rigid mandrels for each layup design, which can be both costly and time intensive.

Accordingly, there is a need for reformable rigid mandrels that can be easily formed to a desired contoured shape before layup, eliminating a draping operation, and which can further allow for non-destructive removal and reuse of the reformable mandrel.

BRIEF SUMMARY

This summary is intended merely to introduce a simplified summary of some aspects of one or more implementations of the present disclosure. This summary is not an extensive overview, nor is it intended to identify key or critical elements of the present teachings, nor to delineate the scope of the disclosure. Rather, its purpose is merely to present one or more concepts in simplified form as a prelude to the detailed description below.

The foregoing and/or other aspects and utilities exemplified in the present disclosure may be achieved by providing a reformable mandrel for making a composite part, including a core including a transitional state material having a transition temperature; and a sleeve at least partially surrounding the core and including a heat-resistant flexible material having an operational temperature, wherein the core is configured to maintain a rigid state below the transition temperature and a flexible state above the transition temperature, and wherein the operational temperature is higher than the transition temperature and the sleeve does not deform at or below the operational temperature and provides sufficient support to an uncured composite part to be placed on the reformable mandrel for making a composite part.

The transitional state material can include at least one of low transition temperature thermoplastics or polymers, shape memory polymers, shape memory composites, shape memory metal alloys, or soft-metal alloys.

The transitional state material can include shape memory polymers.

The transitional state material can include a shape memory composite material including a thermoplastic or epoxy shape memory polymers and one or more reinforcing fibers.

The transition temperature can include a temperature between about 100° F. to about 300° F. or a temperature range within from about 100° F. to about 300° F.

The transition temperature can be a temperature range from about 150° F. to about 160° F., and the core can maintain a rigid state below about 150° F. and a flexible state above about 160° F.

The transition temperature can be lower than a curing temperature for an uncured composite part to be placed on the reformable mandrel for making a composite part.

The core can transition from a rigid state to a flexible state when heated above a transition temperature that is at least 150° F. but not more than a minimum curing temperature for an uncured composite part to be placed on the reformable mandrel for making a composite part.

The core can transition from a rigid state to a flexible state when heated above a transition temperature that is at least 150° F. but not more than a 250° F. curing temperature for an uncured composite part to be placed on the reformable mandrel for making a composite part.

The sleeve can include a flexible rubber material.

The sleeve can include a castable rubber material.

The sleeve can include a silicone rubber.

The operational temperature can be higher than a curing temperature for an uncured composite part to be placed on the reformable mandrel for making a composite part, and the sleeve does not deform at or below the curing temperature.

The operational temperature can be from about 100° F. to about 700° F.

The sleeve can provide sufficient support to an uncured composite part to be placed on the reformable mandrel for making a composite part at or below the curing temperature.

The core of the reformable mandrel can be configured to transition to a flexible state when heated above the transition temperature, allowing the reformable mandrel to be shaped into a desired contoured shape, wherein the sleeve is sufficiently flexible to bend along with the core and conform to the desired contoured shape while maintaining its cross-sectional geometry when the reformable mandrel is shaped.

The reformable mandrel can be configured to maintain the contoured shape when below the transition temperature while an uncured composite part is placed on the reformable mandrel for making a composite part.

The core of the reformable mandrel can be configured to transition to a flexible state when heated above the transition temperature to facilitate removal of the reformable mandrel.

The foregoing and/or other aspects and utilities exemplified in the present disclosure may also be achieved by providing a system for making a composite part with a reformable mandrel, including a reformable mandrel to receive an uncured composite part; and a contouring tool configured to receive the reformable mandrel and conform the reformable mandrel to a contour of the contouring tool when the core of the reformable mandrel is in a flexible state, wherein the reformable mandrel includes a core including a transitional state material having a transition temperature, and a sleeve at least partially surrounding the core and including a heat-resistant flexible material having an operational temperature, wherein the core of the reformable mandrel is configured to maintain a rigid state below the transition temperature and a flexible state above the transition temperature, and wherein the operational temperature is higher than the transition temperature and the sleeve does not deform at or below the operational temperature and provides sufficient support to the uncured composite part placed on the reformable mandrel.

The transition temperature can be lower than a curing temperature for an uncured composite part to be placed on the reformable mandrel for making a composite part.

The contouring tool can include a cavity configured to receive the reformable mandrel.

The foregoing and/or other aspects and utilities exemplified in the present disclosure may also be achieved by providing a method for making a composite part using a reformable mandrel, including contouring a reformable mandrel; placing an uncured composite part on the reformable mandrel; curing the uncured composite part; and removing the reformable mandrel, wherein the reformable mandrel includes a core including a transitional state material having a transition temperature, and a sleeve at least partially surrounding the core and comprising a heat-resistant flexible material having an operational temperature.

The core of the reformable mandrel can be configured to maintain a rigid state below the transition temperature and a flexible state above the transition temperature, wherein the operational temperature of the sleeve is higher than the transition temperature of the core, and wherein the sleeve does not deform at or below the operational temperature and the sleeve can be configured to provide sufficient support to the uncured composite part placed on the reformable mandrel.

The operational temperature of the sleeve can be higher than a curing temperature for the uncured composite part placed on the reformable mandrel, and the sleeve does not deform at or below the curing temperature.

Contouring the reformable mandrel can include heating the core of the reformable mandrel to a temperature above the transition temperature at which the core is in a flexible state; placing the reformable mandrel on a contouring tool; and cooling the core of the reformable mandrel to a temperature below the transition temperature at which the core is in a rigid state.

Contouring the reformable mandrel can further include conforming the reformable mandrel to a contour of the contouring tool; and removing the reformable mandrel from the contouring tool.

The uncured composite part can include two or more complementary uncured composite parts, and contouring the reformable mandrel can include contouring the reformable mandrel to reflect the contour of a second uncured composite part.

Placing the uncured composite part on the reformable mandrel can include placing one or more plies of composite material on the reformable mandrel, and the core of the reformable mandrel can be in a rigid state during placement of the uncured composite part.

Placing an uncured composite part on the reformable mandrel can include placing a first uncured composite part on the reformable mandrel and placing the reformable mandrel on the second uncured composite part.

Curing the uncured composite part can include at least one of heating the uncured composite part to the curing temperature for a predetermined time, or applying a pressure to the uncured composite part for a predetermined time.

The core can be configured to transition to the flexible state at a temperature above the transition temperature that concurrently causes gradual curing of the uncured composite part.

Curing the uncured composite part can include co-curing the first uncured composite part and the second uncured composite part to create a combined composite part.

Removing the reformable mandrel can include removing the reformable mandrel from the cured composite part while the core of the reformable mandrel is in a flexible state.

The reformable mandrel can be deformed non-destructively as it is removed from the cured composite part.

The reformable mandrel can be removed by pulling out of a cavity of the cured composite part.

Removing the reformable mandrel can include removing the reformable mandrel from the first uncured composite part while the reformable mandrel is above the transition temperature at which the core of the reformable mandrel is in a flexible state.

The method can further include reforming the reformable mandrel, wherein reforming the reformable mandrel can include placing the reformable mandrel on a contouring tool, cooling the reformable mandrel, and removing the reformable mandrel from the contouring tool.

Reforming the reformable mandrel can further include conforming the reformable mandrel to a contour of the contouring tool, and removing the reformable mandrel from the contouring tool.

The foregoing and/or other aspects and utilities exemplified in the present disclosure may also be achieved by providing a method for making a combined composite part using a reformable mandrel, including placing a reformable mandrel on a complimentary composite part, placing a first uncured composite part on the reformable mandrel, co-curing the complimentary composite part and the first uncured composite part to form a combined composite part, and removing the reformable mandrel, wherein the reformable mandrel includes a core including a transitional state material having a transition temperature, and a sleeve at least partially surrounding the core and including a heat-resistant flexible material having an operational temperature.

The core of the reformable mandrel can be configured to maintain a rigid state below the transition temperature and a flexible state above the transition temperature, the operational temperature of the sleeve can be higher than the transition temperature of the core, the sleeve does not deform at or below the operational temperature, and the sleeve can be configured to provide sufficient support to the first uncured composite part placed on the reformable mandrel.

The operational temperature of the sleeve can be higher than a curing temperature for the first uncured composite part placed on the reformable mandrel and the complimentary composite part, and the sleeve does not deform at or below the curing temperature.

The method can further include reforming the reformable mandrel.

Placing the reformable mandrel on the complimentary composite part can include contouring the reformable mandrel, placing one or more plies of composite material on the contoured reformable mandrel, and placing the contoured reformable mandrel with the one or more plies of composite material on the complimentary composite part.

Placing the first uncured composite part on the reformable mandrel can include placing one or more plies of composite material on the reformable mandrel, and the core of the reformable mandrel can be in a rigid state during placing of the first uncured composite part.

Co-curing the complimentary composite part and the first uncured composite part to form a combined composite part can include at least one of heating the complimentary composite part and the first uncured composite part to a curing temperature for a predetermined time, or applying a pressure to the complimentary composite part and/or the first uncured composite part for a predetermined time.

Removing the reformable mandrel can include removing the reformable mandrel from the combined composite part while the core of the reformable mandrel is in a flexible state.

The reformable mandrel can be deformed non-destructively as it is removed from the combined composite part.

Further areas of applicability will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The accompanying drawings, which are incorporated in, and constitute a part of this specification, illustrate implementations of the present teachings and, together with the description, serve to explain the principles of the disclosure. In the figures.

Figure 1:
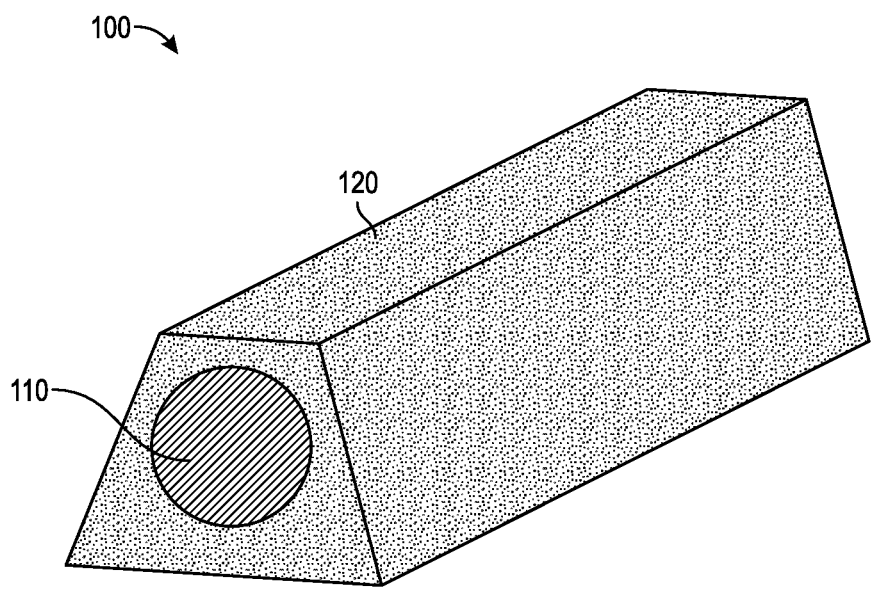
FIG. 1 illustrates a reformable mandrel for making a composite part according to implementations of the present disclosure.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary implementations of the present teachings, examples of which are illustrated in the accompanying drawings. Generally, the same reference numbers will be used throughout the drawings to refer to the same or like parts.

Throughout the specification and claims, the following terms take the meanings explicitly associated herein, unless the context clearly dictates otherwise. Phrases, such as, "in an implementation," "in certain implementations," and "in some implementations" as used herein do not necessarily refer to the same implementation(s), though they may. Furthermore, the phrases "in another implementation" and "in some other implementations" as used herein do not necessarily refer to a different implementation, although they may. As described below, various implementations can be readily combined, without departing from the scope or spirit of the present disclosure.

As used herein, the term "or" is an inclusive operator, and is equivalent to the term "and/or," unless the context clearly dictates otherwise. The term "based on" is not exclusive and allows for being based on additional factors not described unless the context clearly dictates otherwise. In the specification, the recitation of "at least one of A, B, and C," includes implementations containing A, B, or C, multiple examples of A, B, or C, or combinations of A/B, A/C, B/C, A/B/B/ B/B/C, AB/C, etc. In addition, throughout the specification, the meaning of "a," "an," and "the" include plural references. The meaning of "in" includes "in" and "on." Similarly, implementations of the present disclosure may suitably comprise, consist of, or consist essentially of, the elements A, B, C, etc.

It will also be understood that, although the terms first, second, etc. can be used herein to describe various elements, these elements should not be limited by these terms. These terms are only used to distinguish one element from another. For example, a first object, component, or step could be termed a second object, component, or step, and, similarly, a second object, component, or step could be termed a first object, component, or step, without departing from the scope of the invention. The first object, component, or step, and the second object, component, or step, are both, objects, component, or steps, respectively, but they are not to be considered the same object, component, or step. It will be further understood that the terms "includes," "including," "comprises" and/or "comprising," when used in this specification, specify the presence of stated features, steps, operations, elements, and/or components, but do not preclude the presence or addition of one or more other features, steps, operations, elements, components, and/or groups thereof. Further, as used herein, the term "if" can be construed to mean "when" or "upon" or "in response to determining" or "in response to detecting," depending on the context.

All physical properties that are defined hereinafter are measured at 20° C. to 25° C. (68° F. to 77° F.) unless otherwise specified.

When referring to any numerical range of values herein, such ranges are understood to include each and every number and/or fraction between the stated range minimum and maximum, as well as the endpoints. For example, a range of 0.5% to 6% would expressly include all intermediate values of, for example, 0.6%, 0.7%, and 0.9%, all the way up to and including 5.95%, 5.97%, and 5.99%, among many others. The same applies to each other numerical property and/or elemental range set forth herein, unless the context clearly dictates otherwise.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges. The terms "about" or "substantial" and "substantially" or "approximately," with reference to amounts or measurement values, are meant that the recited characteristic, parameter, or values need not be achieved exactly. Rather, deviations or variations, including, for example, tolerances, measurement error, measurement accuracy limitations, and other factors known to those skilled in the art, may occur in amounts that do not preclude the effect that the characteristic was intended to provide. As used herein, "about" is to mean within +/−10% of a stated target value, maximum, or minimum value.

Unless otherwise specified, all percentages and amounts expressed herein and elsewhere in the specification should be understood to refer to percentages by weight. The percentages and amounts given are based on the active weight of the material. For example, for an active ingredient provided as a solution, the amounts given are based on the amount of the active ingredient without the amount of solvent or may be determined by weight loss after evaporation of the solvent.

With regard to procedures, methods, techniques, and workflows that are in accordance with some implementations, some operations in the procedures, methods, techniques, and workflows disclosed herein can be combined and/or the order of some operations can be changed.

FIG. 1 illustrates a reformable mandrel for making a composite part according to implementations of the present disclosure. As illustrated in FIG. 1, a reformable mandrel 100 for making a composite includes a core 110 and a sleeve 120.

The core 110 includes a transitional state material, such as a shape memory material, having a transition temperature. As used herein, the term "transitional state material" refers to a material whose mechanical properties undergo a radical change given a defined condition, such as a transition temperature. For example, a transitional state material may undergo a rapid transition in rigidity around a pre-defined temperature, such as 160° F. In some implementations, a transitional state material transitions to a flexible state when above the transition temperature and transitions to a rigid state when below the transition temperature. In some implementations, a transitional state material will maintain its rigid state indefinitely until heated above its transition temperature.

Example of usable transitional state materials include, but are not limited to, low transition temperature thermoplastics or polymers (ABS, Acrylic, PLA, PVC, PPE, PPS, PMMA), shape memory polymers, such as polytetrafluoroethylene (PFTE), polylactide (PLA), or ethylene-vinyl acetate (EVA), shape memory composites, such as a combination of shape memory polymers and carbon fibers or other reinforcing fibers, shape memory metal alloys, such as nickel-titanium alloy, or soft-metal alloys, such as aluminum alloys, copper alloys, magnesium alloys, lead alloys, gold alloys, or silver alloys. For example, the transitional state material can include shape memory polymers. In one implementation, the transitional state material includes a shape memory composite material comprising a combination of thermoplastic or epoxy shape memory polymers and one or more reinforcing fibers, such as carbon fibers, aramid fibers, boron fibers or other suitable fibers, examples of which are commercially available as SMART TOOLING from Spintech Holdings, Inc. The composition of the transitional state material may comprise varying amounts of reinforcing fibers or plasticizers to adjust the transition temperature of the material, where a transitional state material possessing a lower transition temperature may be associated with a higher content of plasticizers, such as polyethylene glycol.

As used herein, the term "transition temperature" refers to a temperature at which a material transitions from a rigid state to a flexible state or vice versa. A transition temperature can change slightly over time due to thermal degradation and other effects on the core 110. Accordingly, in some implementation, the transition temperature can include a temperature range for operational purposes and/or to provide some tolerance. For example, transition temperature variance may occur due to geometry and heat transfer rates, thermal degradation, material contamination, ambient conditions, and the like.

Accordingly, the core 110 maintains a rigid state below the transition temperature and a flexible state above the transition temperature. Alternatively, the core 110 maintains a rigid state below a transition temperature range and a flexible state above the transition temperature range. The transition temperature range can be +/−5° F., +/−10° F., or +/−15° F. around a specific transition temperature.

The reformable mandrel 100 can include a core 110 comprising a transitional state material having a transition temperature, and the core 110 of the reformable mandrel 100 is configured to maintain a rigid state below the transition temperature and a flexible state above the transition temperature.

In one implementation, the transition temperature can include a temperature from about 100° F. to about 300° F. or the transition temperature can include a temperature range within from about 100° F. to about 300° F. For example, the transition temperature can be about 150° F., and the core 110 can maintain a rigid state below about 150° F. and a flexible state above about 150° F. In another example, the transition temperature can be a temperature range from about 150° F. to about 160° F., and the core 110 can maintain a rigid state below about 150° F. and a flexible state above about 160° F.

In other implementations, the transition temperature can be about 150° F., about 190° F., about 200° F., or about 300° F., or the transition temperature range can be from about 140° F. to 160° F., from about 180° F. to about 200° F., from about 190° F. to about 210° F., or from about 290° F. to about 310° F., and the core 110 can maintain a rigid state below the transition temperature or transition temperature range and a flexible state above the transition temperature or transition temperature range.

The transition temperature of the core 110 is lower than a curing temperature for an uncured composite part to be placed on the reformable mandrel 100 for making a composite part. In some implementations, the transitional state material of the core 110 is selected according to said cure temperature. For example, the transitional state material is selected to have a transition temperature that is at least 10° F. lower than a curing temperature for an uncured composite part to be placed on the reformable mandrel 100 for making a composite part. In other implementations, the transition temperature is at least 20° F., 30° F., 40° F., 50° F., 60° F., 70° F., 80° F., 90° F., 100° F., 110° F., 120° F., 130° F., 140° F., or 150° F. lower than the curing temperature.

The difference between the transition temperature and the curing temperature can be tailored for each composite part according to a desired configuration and/or processing parameters. For example, some geometries for the uncured composite part may favor a higher difference between the transition and cure temperatures, allowing the core 110 of the reformable mandrel 100 to transition to a flexible state and allow plies of composite material wrapped on the reformable mandrel 100 to conform earlier during the temperature increase at the start of curing process. Other geometries may respond better to a smaller difference between the transition and cure temperatures, keeping the reformable mandrel 100 and its wrapped composite plies rigid in their position for longer, until just prior to reaching cure temperature.

In some implementations, the curing temperature is from about 250° F. to about 450° F., and the transition temperature of the core 110 includes any temperature or temperature range within from about 100° F. to about 300° F. that is lower than the curing temperature. For example, the core 110 can transition from a rigid state to a flexible state when heated above a transition temperature from about 150° F. and 180° F., such as, when heated above 150° F., 160° F., 165° F., 170° F., 175° F., or 180° F.; the core 110 can transition from a rigid state to a flexible state when heated above a transition temperature from about 150° F. and 250° F., such as, when heated above 150° F., 175° F., 200° F., 225° F., or 250° F. In other implementations, the core 110 transitions from a rigid state to a flexible state when heated above its transition temperature range. For example, when heated above 180° F. for a transition temperature range between 150° F. and 180° F., or when heated above 165° F. for a transition temperature range between 150° F. and 165° F.

For example, the core 110 can transition from a rigid state to a flexible state when heated above a transition temperature that is at least 150° F. but not more than a minimum curing temperature for an uncured composite part to be placed on the reformable mandrel 100 for making a composite part. In one implementation, the core 110 can transition from a rigid state to a flexible state when heated above a transition temperature that is at least 150° F. but not more than a 250° F. curing temperature for an uncured composite part to be placed on the reformable mandrel 100 for making a composite part.

The sleeve 120 at least partially surrounds the core 110. In some implementations, the sleeve 120 completely surrounds the core 110. The sleeve includes a heat-resistant flexible material having an operational temperature. For example, the sleeve can include a flexible rubber material, such as a silicone rubber. The flexible material can be castable. For example, the flexible material can include a castable rubber material. In other implementations, the flexible material can include urethanes, polyurethanes, or ethylene propylene diene monomer (EPDM).

The sleeve 120 is configured to bend along its length while generally maintaining its cross-sectional geometry. The sleeve 120 is configured to have enough integrity to encapsulate and protect the core 110 when the reformable mandrel 100 is in a flexible state, allowing the core 110 and the sleeve 120 forming the reformable mandrel 100 to be removed and handled without distortion or damage to the core 110. In addition, removal of the reformable mandrel 100 does not affect the cured composite part, because in the flexible state both the core 110 and sleeve 120 are significantly less rigid than the cured composite part. The sleeve 120 is not significantly affected by the operating temperatures (curing temperatures, transition temperatures) and therefore its flexibility does not change during or through use cycles. In some implementations, the flexible material of the sleeve 120 is selected to have very little adhesion to the composite material, further easing removal of the reformable mandrel 100.

The sleeve 120 has an operational temperature. The operational temperature of the sleeve 120 is higher than a curing temperature for an uncured composite part to be placed on the reformable mandrel 100. For example, the operational temperature of the sleeve 120 is higher than a curing temperature for an uncured composite part that may be placed on the reformable mandrel 100 to form a composite part.

As used herein, the term "operational temperature" refers to the temperature below which the sleeve 120 will not deform or melt, and will provide adequate support to an uncured composite part to be placed on the reformable mandrel 100 when heated to the cure temperature for making a composite part. For example, the sleeve 120 will substantially maintain its cross-sectional geometry at or below its operational temperature. The sleeve 120 can have an operational temperature up to 200° F., 300° F., 400° F., 500° F., 600° F., or 700° F.

For example, the operational temperature can be 200° F. or higher, 300° F. or higher, 400° F. or higher, 500° F. or higher, 600° F. or higher, or from about 200° F. to about 700° F., from about 300° F. to about 700° F., from about 400° F. to about 700° F., from about 500° F. to about 700° F., or from about 600° F. to about 700° F.

In one implementation, the sleeve 120 is made of a heat-resistance flexible rubber that is configured to maintain its cross-sectional geometry during heating up to a temperature of 700° F. In other implementations, the sleeve 120 is configured to maintain its cross-sectional geometry during heating up to 200° F., 300° F., 400° F., 500° F., 600° F., or 700° F.

Accordingly, the reformable mandrel 100 can include a sleeve 120 at least partially surrounding the core 110 and including a heat-resistant flexible material having an operational temperature, wherein the operational temperature is higher than the transition temperature and the sleeve 120 does not deform at or below the operational temperature and provides sufficient support to an uncured composite part to be placed on the reformable mandrel 100 for making a composite part. Similarly, the operational temperature of the sleeve 120 is higher than a curing temperature of an uncured composite part to be placed on the reformable mandrel 100 for making a composite part, and the sleeve 120 does not deform at or below the curing temperature.

Because the reformable mandrel 100 includes a core 110, the reformable mandrel 100 is flexible when heated above the transition temperature of the core 110. Accordingly, the reformable mandrel 100 can be shaped to a desired contour when the core 110 is in the flexible state. For example, the reformable mandrel 100 can be heated above a transition temperature of the core 110, transitioning the core 110 to a flexible state and allowing the reformable mandrel 100 to be shaped into a desired contour, such as by placing the reformable mandrel 100 on a contoured surface. The sleeve 120 is sufficiently flexible to bend along with the core 110 and conform to the desired contour while generally maintaining its cross-sectional geometry. The desired contour can correspond to a desired contour for the composite part formed using the reformable mandrel 100 (see FIGS. 5 and 10).

Accordingly, the reformable mandrel 100 can be configured to transition to a flexible state when heated above the transition temperature, allowing the reformable mandrel 100 to be shaped into a desired contoured shape, wherein the sleeve 120 is sufficiently flexible to bend along with the core 110 and conform to the desired contoured shape while maintaining its cross-sectional geometry when the reformable mandrel 100 is shaped.

When cooled to a temperature below the transition temperature, the core 110 transitions to a rigid state. For example, after shaping the reformable mandrel 100 to a desired contour, the reformable mandrel 100 can be cooled below the transition temperature of the core 110, transitioning the core 110 to a rigid state and allowing the reformable mandrel 100 to maintain the contoured shape. Accordingly, the reformable mandrel 100 can be configured to maintain the contoured shape while an uncured composite part is placed on the reformable mandrel 100 for making a composite part.

After an uncured composite part is placed on the reformable mandrel 100, the reformable mandrel 100 can be heated to facilitate its removal. For example, during or after a curing process of an uncured composite part placed on the reformable mandrel 100, the core 110 of the reformable mandrel 100 can be configured to transition to a flexible state when heated above the transition temperature to facilitate removal of the reformable mandrel 100.

The reformable mandrel 100 combines the benefits of a flexible mandrel, such as an ability to apply good compaction to composite parts during curing, and ease of non-destructive removal from complex and contoured geometries, with the benefits of rigid mandrels, such as facilitating layup and geometric performance of complex, contoured shapes, without wrinkling or distorting the composite plies.

The reformable mandrel 100 can be configured to become flexible during a curing process. For example, an uncured composite part may be placed on the reformable mandrel 100 when the reformable mandrel 100 is in a rigid state. During a curing process, the reformable mandrel 100 is heated, and the core 110 of the reformable mandrel 100 transitions to a flexible state. Layup of the uncured composite part on the reformable mandrel 100 is enhanced and good compaction of the uncured composite part on the reformable mandrel 100 is provided. For example, using a vacuum bag to compact composite plies on a flexible mandrel, such as the reformable mandrel 100 in its flexible state, forces a flexible mandrel to comply well with the contour of the part below it. In contrast, a rigid mandrel would not allow good geometric conformance to the underlying composite part.

Figure 2:
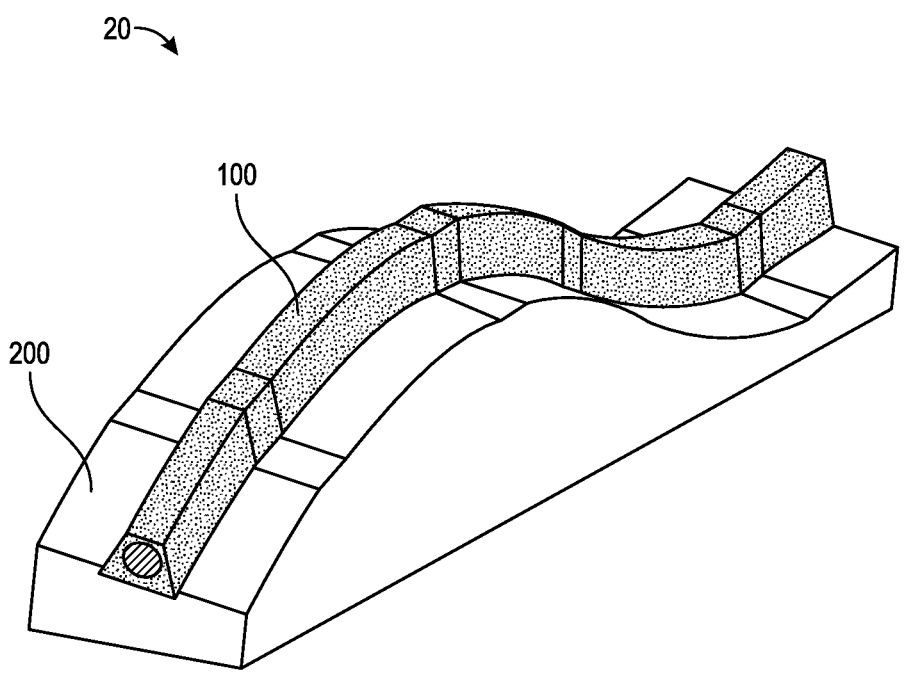
FIG. 2 illustrates a system for making a composite part using a reformable mandrel according to implementations of the present disclosure
Figure 3:
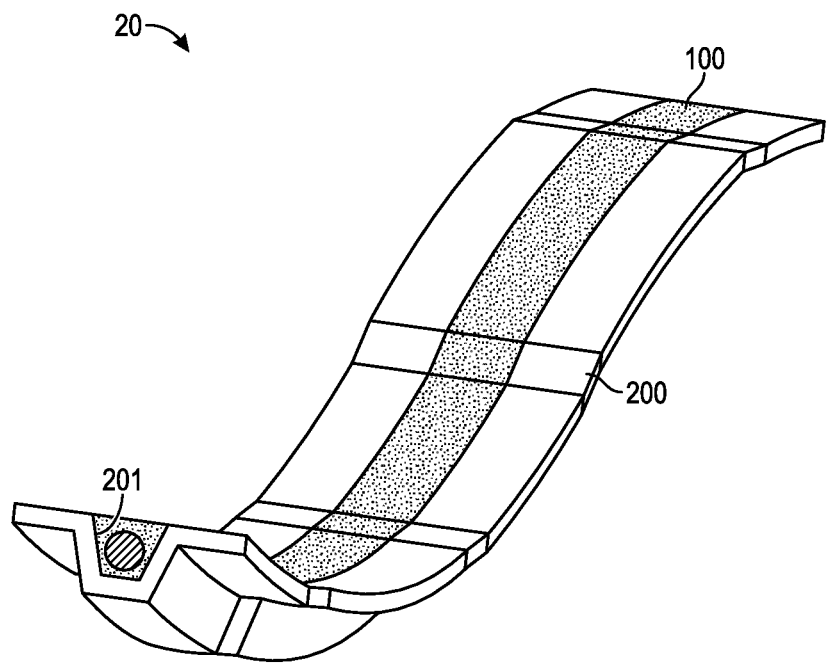
FIG. 3 illustrates a system for making a composite part using a reformable mandrel according to implementations of the present disclosure

FIGS. 2-3 illustrate a system for making a composite part using a reformable mandrel according to implementations of the present disclosure. FIGS. 2-3 illustrate examples of a system that, for instance, could be used with the reformable mandrel 100 as described above and as illustrated in FIG. 1. As such, the discussion below will reference various components as illustrated in FIG. 1. As illustrated in FIGS. 2-3, a system 20 for making a composite part with a reformable mandrel includes a reformable mandrel 100 and a contouring tool 200. The reformable mandrel 100 is configured to be used for layup of an uncured composite part, and the contouring tool 200 is configured to adjustably contour to receive the reformable mandrel 100 and conform the reformable mandrel 100 to a contour of the contouring tool 200 when the core 110 of the reformable mandrel 100 is in a flexible state.

The reformable mandrel 100 includes a core 110 comprising a transitional state material having a transition temperature, and a sleeve 120 at least partially surrounding the core 110 and comprising a heat-resistant flexible material having an operational temperature. The core 110 of the reformable mandrel 100 can be configured to maintain a rigid state below the transition temperature and a flexible state above the transition temperature. The operational temperature is higher than the transition temperature, and the sleeve 120 does not deform at or below the operational temperature. The sleeve 120 is configured to provide sufficient support to the uncured composite part placed on the reformable mandrel 100.

The operational temperature of the sleeve 120 is higher than a curing temperature for the uncured composite part placed on the reformable mandrel 100, and the sleeve 120 does not deform at or below the curing temperature.

For example, the contouring tool 200 may include a tool having an upper surface that is adjustably reconfigurable to be representative of the geometry that the wrapped reformable mandrel 100 will be installed on. The contouring tool 200 may comprise a configurable die or jig with an upper surface formed by a flexible panel, which is supported by variable height pins that are independently adjustable in height to establish a curved upper surface representative of a contoured geometry of a composite part to be fabricated. Materials may include metallic, composites, plastics, or other material capable of withstanding the reforming transition temperature.

The core 110 of the reformable mandrel 100 may be heated to a flexible state and the reformable mandrel 100 may be draped on the contouring tool 200 to conform the reformable mandrel 100 to the contour of the contouring tool 200.

As illustrated in FIG. 3, the contouring tool 200 may include a cavity 201 configured to receive the reformable mandrel 100. The cavity 201 may have dimensions corresponding to those of the reformable mandrel 100. The cavity 201 is configured to constrain the reformable mandrel 100 within the contouring tool 200 to ensure that the reformable mandrel 100 conforms to the contour of the contouring tool 200. The cavity 201 allows for better geometric control of the reformable mandrel 100.

FIGS. 4-13 illustrate a method for making a composite part using a reformable mandrel according to implementations of the present disclosure. FIGS. 4-13 illustrate examples of a method that, for instance, could be used with the reformable mandrel 100 and the system 20 as described above and as illustrated in FIGS. 1-3. As such, the discussion below will reference various components as illustrated in FIGS. 1-3.

Figure 4:
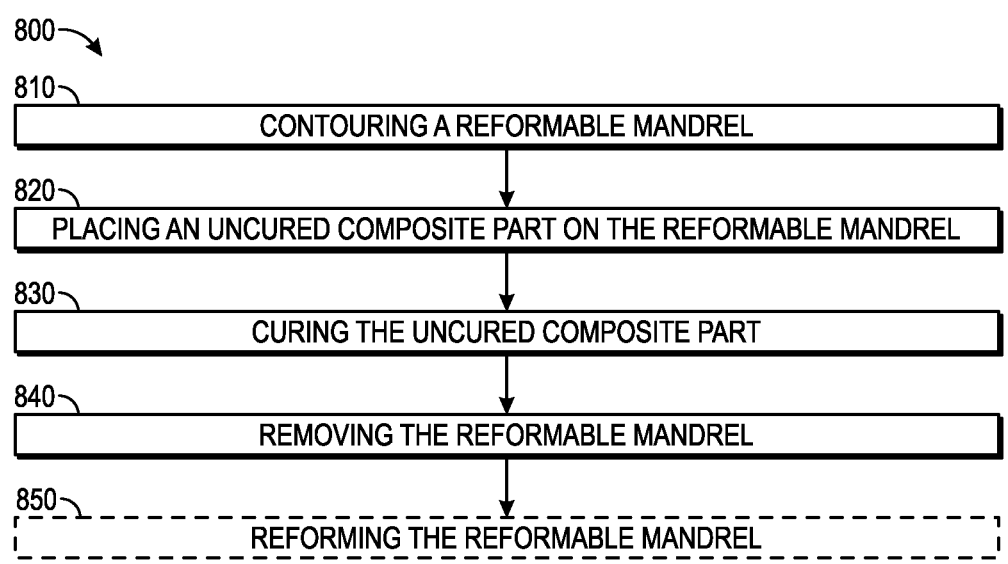
FIGS. 4-13 illustrate methods for making a composite part using a reformable mandrel according to implementations of the present disclosure.

As illustrated in FIG. 4, a method 800 for making a composite part 500 using a reformable mandrel 100 includes contouring a reformable mandrel 100 in operation 810; placing an uncured composite part 300 on the reformable mandrel 100 in operation 820; curing the uncured composite part 300 in operation 830; and removing the reformable mandrel 100 in operation 840. Method 800 can further include reforming the reformable mandrel 100 in operation 850.

The reformable mandrel 100 can include a core 110 comprising a transitional state material having a transition temperature, and a sleeve 120 at least partially surrounding the core 110 and comprising a heat-resistant flexible material having an operational temperature.

The core 110 of the reformable mandrel 100 can be configured to maintain a rigid state below the transition temperature and a flexible state above the transition temperature, and the operational temperature of the sleeve is higher than the transition temperature of the core 110. The sleeve 120 does not deform at or below the operational temperature and the sleeve 120 can be configured to provide sufficient support to the uncured composite part 300 placed on the reformable mandrel 100.

The operational temperature of the sleeve 120 is higher than a curing temperature for the uncured composite part 300 placed on the reformable mandrel 100, and the sleeve 120 does not deform at or below the curing temperature.

Figure 5:
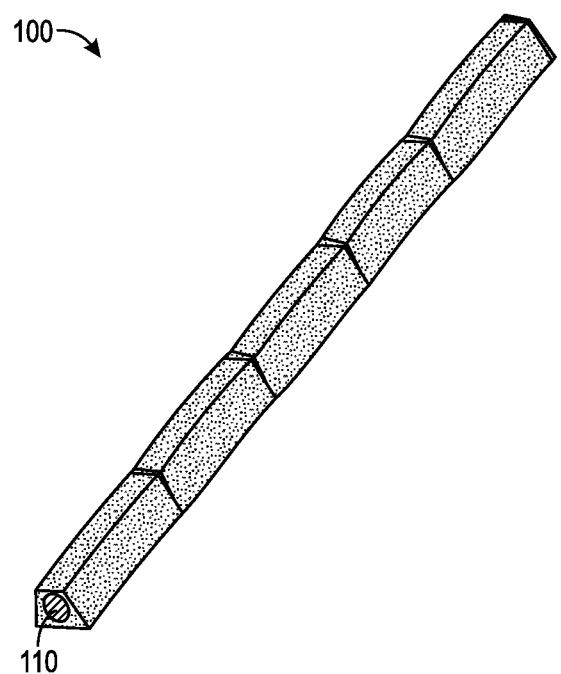
Figure 6:
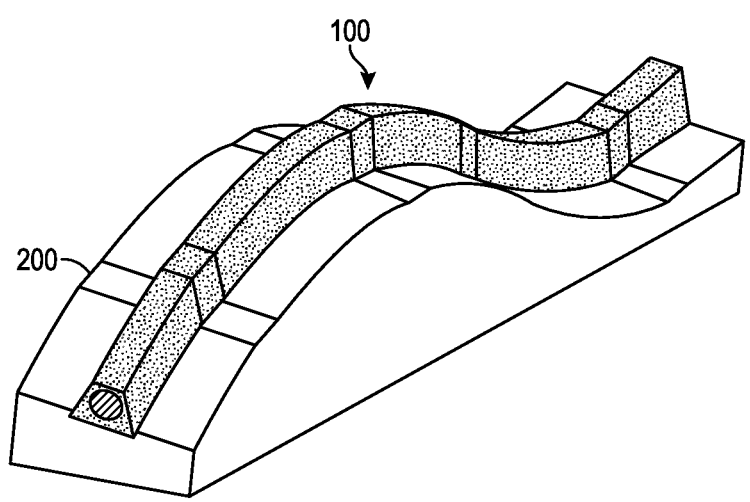
Figure 7:
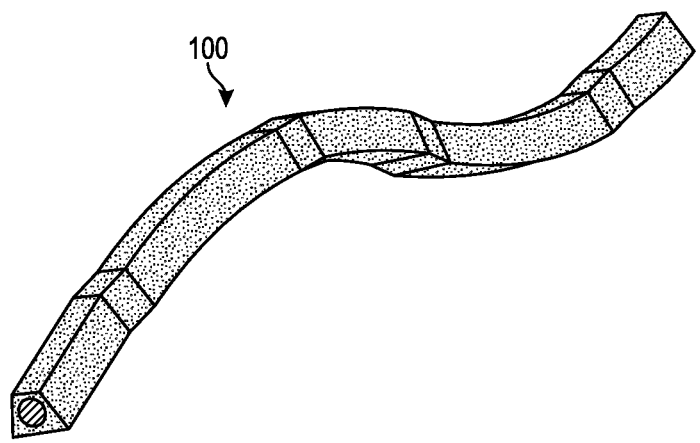

As illustrated in FIGS. 5-7, contouring the reformable mandrel 100 in operation 810 can include heating the reformable mandrel 100 to a temperature above the transition temperature, placing the reformable mandrel 100 on a contouring tool 200, and cooling the reformable mandrel 100 to a temperature below the transition temperature. Operation 810 can further include conforming the reformable mandrel 100 to a contour of the contouring tool 200 and removing the reformable mandrel 100 from the contouring tool 200.

As illustrated in FIG. 5, a reformable mandrel 100 can be provided in an initial rigid state. The reformable mandrel 100 can be initially in a flat or straight shape to facilitate transportation and/or storage, and a transition temperature can be well above room temperature to ensure that the reformable mandrel 100 maintains it rigid shape during transport and storage. As described above, the reformable mandrel 100 includes a core 110 comprising a transitional state material having a transition temperature. Heating the reformable mandrel 100 above the transition temperature of the core 110 transitions the core 110 of the reformable mandrel 100 into a flexible state. The reformable mandrel 100 can be heated by electrical or resistive heating, inductive heating, liquid heating, steam heating, or the like.

As illustrated in FIG. 6, the reformable mandrel 100 can be placed on a contouring tool 200 while the core 110 of the reformable mandrel 100 is in a flexible state. Placing the reformable mandrel 100 on the contouring tool 200 can include draping the reformable mandrel 100 onto the contouring tool 200.

In some implementations, the contouring tool 200 holding the reformable mandrel 100 may be placed within an autoclave or an oven to heat the reformable mandrel 100 above the transition temperature or to maintain the reformable mandrel 100 above the transition temperature. In other implementations, one or more heating blankets may be placed on the reformable mandrel 100 to heat it above the transition temperature.

After the reformable mandrel 100 is placed on the contouring tool 200, the reformable mandrel 100 can be conformed to the contour of the contouring tool 200. In one implementation, a weight of the reformable mandrel 100 is sufficient to conform the reformable mandrel 100 to the contour of the contouring tool 200. In other implementations, conforming devices, such as clamps, vacuum bags, and the like, can be used to conform the reformable mandrel 100 to the contour of the contouring tool 200.

The contouring tool 200 is configured to reflect a desired contour for the composite part 500. Accordingly, a resulting contour of the reformable mandrel 100 also reflects the desired contour of the composite part 500.

After the reformable mandrel 100 has conformed to the contour of the contouring tool 200, the reformable mandrel 100 can be cooled to a temperature below the transition temperature. The reformable mandrel 100 can be cooled by removing the heating source. For example, by removing the heating blankets or resistive heating elements from the reformable mandrel 100, or by removing the reformable mandrel 100 from an oven or autoclave.

As described above, cooling the reformable mandrel 100 below the transition temperature of the core 110 transitions the reformable mandrel 100 to a rigid state. Accordingly, the reformable mandrel 100 is able to maintain a contoured state reflecting the contour of the contouring tool 200. In some implementations, the reformable mandrel 100 will maintain its rigid state, and therefore its contoured shape, indefinitely until heated above the transition temperature.

As illustrated in FIG. 7, once cooled to a rigid state, the reformable mandrel 100 can be removed from the contouring tool 200. The now-contoured reformable mandrel 100 reflects the desired contour for a composite part 500 to be formed using the reformable mandrel 100.

Figure 8:
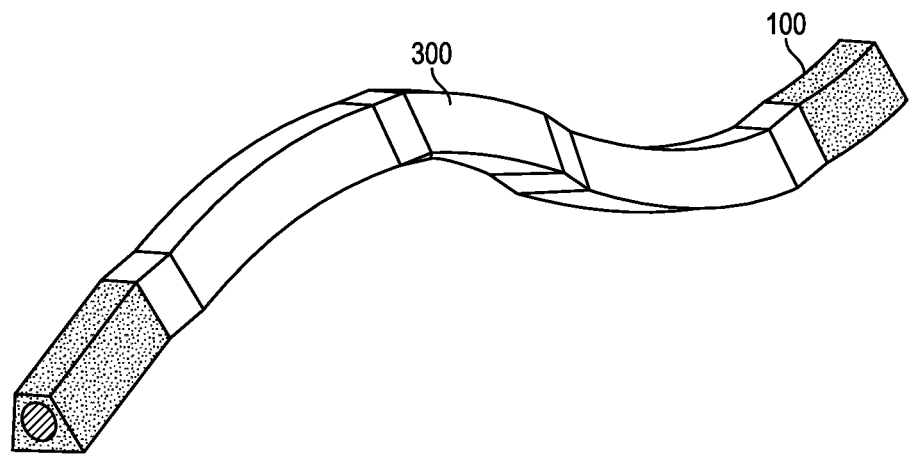

As illustrated in FIG. 8, placing the uncured composite part 300 on the reformable mandrel 100 in operation 820 can include placing one or more plies of composite material on the reformable mandrel 100. The one or more plies of composite material can be placed via hand layup, automated fiber placement (AFP), automated tape layup (ATL), resin infusion, or the like. The reformable mandrel 100 can be in a rigid state during placing of the uncured composite part 300. Because the reformable mandrel 100 is in a rigid state, the reformable mandrel 100 provides sufficient support to form the composite plies to the shape of the reformable mandrel 100. Because the composite plies are placed on the reformable mandrel 100 in its rigid state, the likelihood that wrinkles and/or ply distortion due to the reformable mandrel 100 changing shape after the composite plies are laid up on it is significantly reduced, enhancing the performance of this system.

As used herein the term "uncured composite part" or "preform" refers to one or more plies of composite materials impregnated with resin, such as a thermoset resin or a thermoplastic resin. For example, an uncured composite part 300 may include carbon fiber plies that have been impregnated with an uncured thermoset resin or a thermoplastic resin. The plies of composite material can be fiber reinforced. For example, the composite material can include carbon fiber-reinforced plies or layers of epoxy impregnated unidirectional composite tape. The uncured composite part 300 may be flexible until it is cured, often by heat and/or pressure curing or curing within an autoclave. Other types of carbon fiber include "dry fiber" which has not been impregnated with thermoset resin but may include a tackifier or binder. Dry fiber may be infused with resin prior to curing. For thermoset resins, the hardening is a one-way process referred to as curing, while for thermoplastic resins, the resin may reach a viscous form if it is re-heated.

With respect to composite parts, curing generally refers to the application of heat and/or pressure to crosslink the resin and consolidate the plies of a fiber-reinforced composite part. Some thermoset resins can be partially cured (i.e., crosslinked) without the application of pressure. Accordingly, as used herein, the terms "cure" and "curing" include either the application of heat and/or the application of pressure to the uncured composite parts. In some implementations, the pressure may be applied through use of an autoclave and/or through use of vacuum bags. The heat may be applied through the use of an autoclave, an oven, and/or heating blankets and resistive heating elements.

Accordingly, curing the uncured composite part 300 in operation 830 can include heating the uncured composite part 300 to a curing temperature for a predetermined time. Curing the uncured composite part 300 in operation 830 can further include applying a pressure to the uncured composite part 300 for a predetermined time. For example, curing the uncured composite part 300 can include placing the uncured composite part 300 and the reformable mandrel 100 in an autoclave, and applying a curing pressure and a curing temperature to the uncured composite part 300 for the predetermined time.

In other implementations, the uncured composite part 300 is cured using only heat. For example, curing the uncured composite part 300 can include placing the uncured composite part 300 and the reformable mandrel 100 in an oven, and applying a curing temperature to the uncured composite part 300 for the predetermined time or placing one or more heating blankets or resistive elements on the uncured composite part 300 and applying a curing temperature to the uncured composite part 300 for the predetermined time.

Vacuum bags can be used during curing of the uncured composite part 300 to act as a pressure boundary, remove air from the material system, consolidate plies, and prevent foreign objects from contaminating the materials.

As described above, a curing temperature of the uncured composite part 300 is higher than the transition temperature of the core 110. Accordingly, the core 110 of the reformable mandrel 100 transitions to a flexible state as the uncured composite part 300 is cured.

As used herein, the term "cured" refers to a sufficient degree of stiffness and strength in the composite part 500, such that the reformable mandrel 100 can be safely removed from the composite part 500. For example, a cured composite part 500 can refer to an uncured composite part 300 sufficiently cured to maintain its shape without any distortion or damage after removal of the reformable mandrel 100. After removal of the reformable mandrel 100, additional curing, or post-curing, may be performed to further develop additional stiffness and strength within the composite part 500 to meet desired targets. The degree of cure can be a measure of crosslinking of the resin matrix that is typically calculated and/or tested by well-known means.

As described above, the core 110 of the reformable mandrel 100 can include a transitional state material, such as a shape memory polymer. The core 110 of the reformable mandrel 100 is configured to transition from a rigid state to a flexible state during heating up to the curing temperature for an uncured composite part 300 that is placed on the reformable mandrel 100. Accordingly, the core 110 is configured to transition to the flexible state at a temperature above the transition temperature that concurrently causes gradual curing of the uncured composite part 300.

In some implementations, the core 110 of the reformable mandrel 100 transitions to a flexible state before curing of the uncured composite part 300 is completed. In other implementations, the core 110 of the reformable mandrel 100 remains in the flexible state after curing of the uncured composite part 300.

Figure 9:
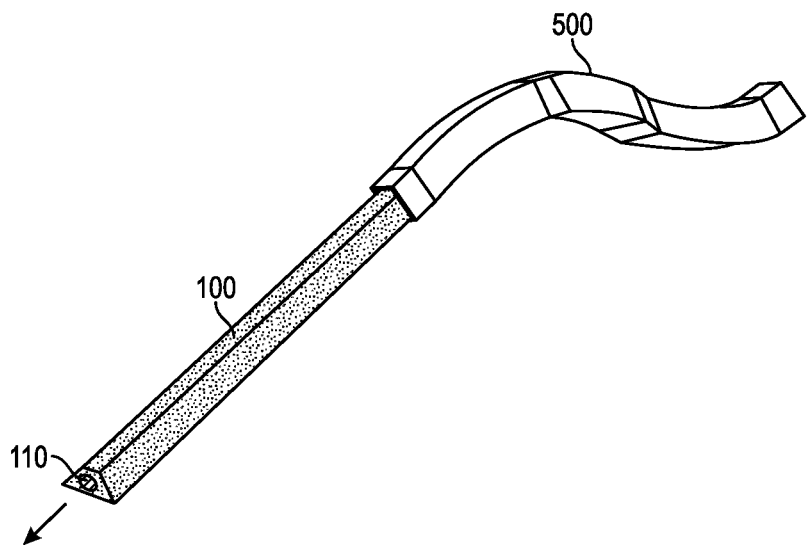

Removing the reformable mandrel 100 in operation 840 can include removing the reformable mandrel 100 from the cured composite part 500 while the core 110 of the reformable mandrel 100 is in a flexible state. For example, as illustrated in FIG. 9, the core 110 of the reformable mandrel 100 can remain above the transition temperature after curing of the uncured composite part 300, such that the core 110 of the reformable mandrel 100 is in a flexible state as it is removed from the cured composite part 500. The reformable mandrel 100 can be deformed as it is removed from the cured composite part 500. Removing the reformable mandrel 100 further includes non-destructively removing the reformable mandrel 100 from the cured composite part 500. Accordingly, the reformable mandrel 100 can be deformed non-destructively as it is removed from the cured composite part 500.

Figure 10:
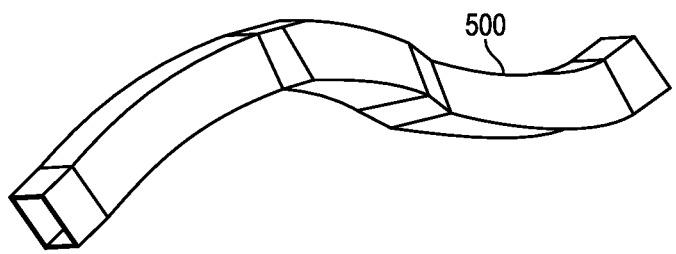

As illustrated in FIG. 10, a composite part 500 remains after removal of the reformable mandrel 100, whereas the composite part 500 reflects a contour of the reformable mandrel 100.

Method 800 is particularly suitable for composite parts 500 incorporating a cavity, such as stringers. Because the reformable mandrel 100 can be deformed during removal, there is less impact on removal from the complex or contoured shape of the composite part 500. For example, as illustrated in FIGS. 9-10, the reformable mandrel 100 can be removed by pulling it straight out of a contoured composite part 500 without damage to either the reformable mandrel 100 or the composite part 500, as the reformable mandrel 100 is sufficiently flexible to deform during removal. For example, the reformable mandrel 100 can be removed by pulling out of a cavity of the cured composite part 500.

In some implementations, low-temperature heating equipment can be used to heat the core 110 of the reformable mandrel 100 above the transition temperature to ensure it is in a flexible state during removal. In other implementations, low-temperature heating equipment can be used to maintain the core 110 of the reformable mandrel 100 above the transition temperature to ensure it is in a flexible state during removal.

The reformable mandrel 100 can be removed by hand, or mechanical methods.

Reforming the reformable mandrel 100 in operation 850 can include placing the reformable mandrel 100 on a contouring tool 200, cooling the reformable mandrel 100, and removing the reformable mandrel 100 from the contouring tool 200. Operation 850 can further include conforming the reformable mandrel 100 to a contour of the contouring tool 200 and removing the reformable mandrel 100 from the contouring tool 200.

Reforming the reformable mandrel in operation 850 is similar to contouring the reformable mandrel 100 in operation 810. For example, after the reformable mandrel 100 is removed from the cured composite part 500, the reformable mandrel 100 can be reformed for reuse. The reformable mandrel 100 is reformed while the core 110 is in a flexible state. The core 110 of the reformable mandrel 100 can remain in the flexible state after removing it from the cured composite part 500 or the core 110 of the reformable mandrel 100 can be heated to a temperature above the transition temperature to place the core 110 of the reformable mandrel 100 in a flexible state.

Operation 850 includes placing the reformable mandrel 100 on a contouring tool 200. The contouring tool 200 can reflect a desired contour for a composite part, such as the contour of the cured composite part 500 (see FIG. 5), or a shape configured to ease transportation and storage of the reformable mandrel 100, such as a flat shape (see FIG. 5).

Operation 850 can include conforming the reformable mandrel 100 to a contour of the contouring tool 200, cooling the reformable mandrel 100 to a temperature below the transition temperature, and removing the reformable mandrel 100 from the contouring tool 200 as described above with respect to operation 810.

Figure 11:
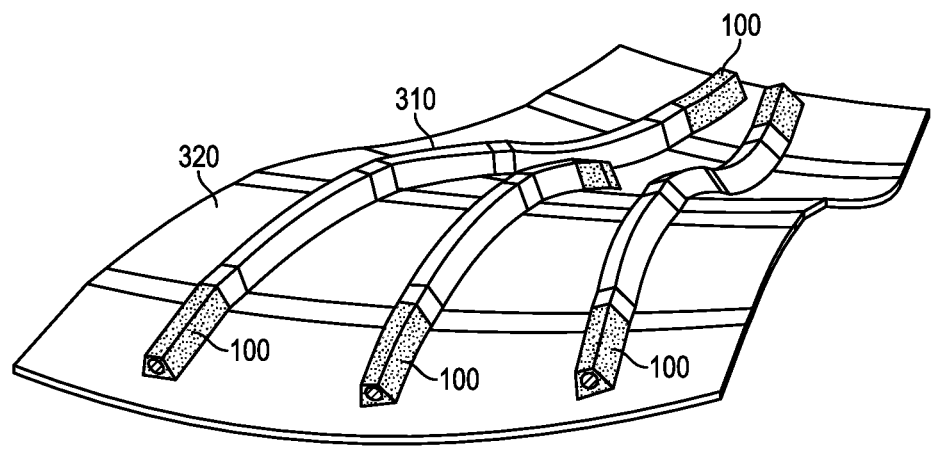
Figure 12:
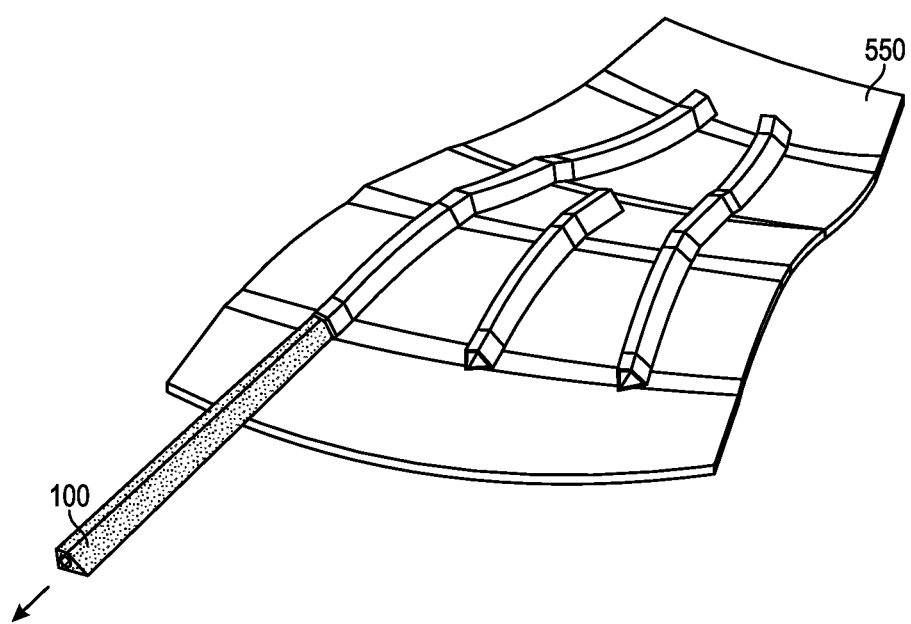
Figure 13:
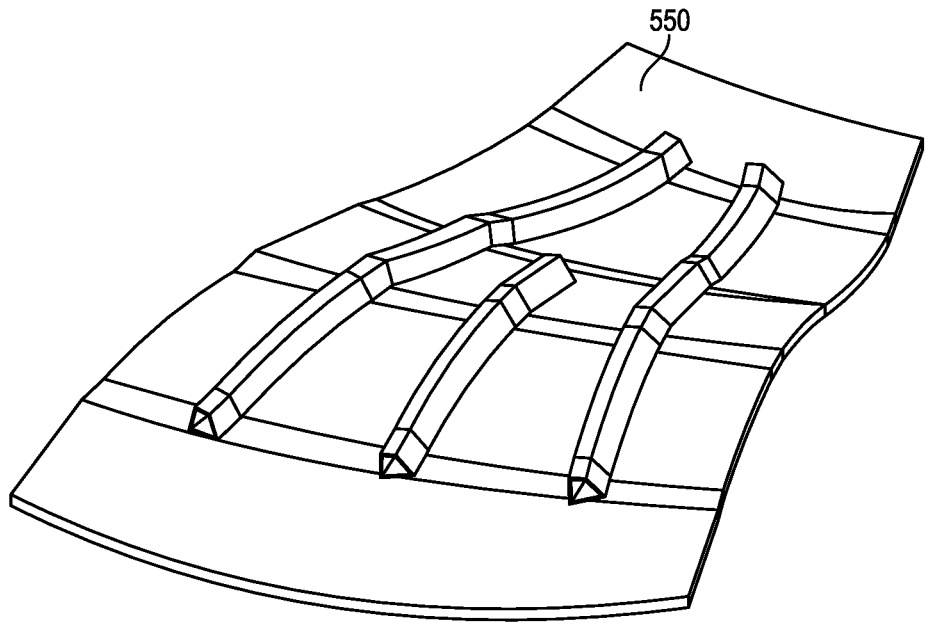

As illustrated in FIGS. 11-13, method 800 can also be used for making a combined composite part 550 using a reformable mandrel 100.

A combined composite part 550 can include two or more complementary preforms or complementary uncured composite parts 300. As used herein, the terms "complementary preforms" or "complementary uncured composite parts" refers to different types of preforms configured to function together in a co-cured or combined composite structure. For example, complementary preforms may include horizontal or vertical stabilizer skins, wing skins, and skin panels providing an overall shape and outer bending and shear strength to an overall composite structure, and stringers or stiffening members to provide additional stiffness to the overall composite structure. In some implementations, stabilizer skins, wing skins, and skin panels are one type of complementary preform and stringers or stiffening members are another type of complementary preform.

For example, as illustrated in FIGS. 11-13, a combined composite part 550 can result from co-curing a first uncured composite part 310, embodied as a stringer, and a second uncured composite part 320, embodied as a contoured composite skin panel.

In some implementations, the second uncured composite part 320 is at least partially cured to maintain a contoured shape. In other implementations, the second uncured composite part 320 is supported by a base configured to maintain a contoured shape of the second uncured composite part 320.

Accordingly, contouring a reformable mandrel 100 in operation 810 can include contouring the reformable mandrel 100 to reflect the contour of the second uncured composite part 320, similar as described above with respect to FIG. 8.

As illustrated in FIG. 11, placing an uncured composite part 300 on the reformable mandrel 100 in operation 820 can include placing a first uncured composite part 310 on the reformable mandrel 100 and placing the reformable mandrel 100 on the second uncured composite part 320. The two uncured composite parts (310 and 320) can be bonded together based on the contact and crosslinking during cure of the resin from one to another.

As illustrated in FIG. 12, curing the uncured composite part 300 in operation 830 can include co-curing the first uncured composite part 310 and the second uncured composite part 320 to create a combined composite part 550, and removing the reformable mandrel 100 in operation 840 can include removing the reformable mandrel 100 from the first uncured composite part 310 while the core 110 of the reformable mandrel 100 is in a flexible state, similarly as described above.

FIGS. 14-18 illustrate a method for making a composite part using a reformable mandrel according to implementations of the present disclosure. FIGS. 14-18 illustrate examples of a method that, for instance, could be used with the reformable mandrel 100, the system 20, and the method 800 as described above and as illustrated in FIGS. 1-13. As such, the discussion below will reference various components as illustrated in FIGS. 1-13.

Figure 14:
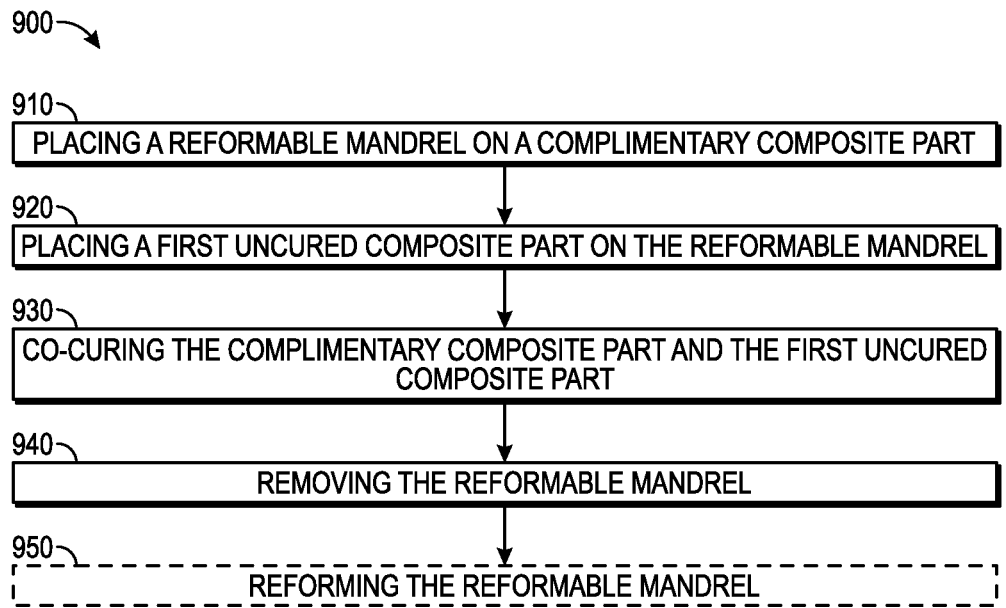
FIGS. 14-18 illustrate a method for making a composite part using a reformable mandrel according to implementations of the present disclosure.

As illustrated in FIG. 14, a method 900 for making a combined composite part 550 using a reformable mandrel 100 includes placing a reformable mandrel 100 on a complimentary composite part 350 in operation 910, placing a first uncured composite part 310 on the reformable mandrel 100 in operation 920, co-curing the complimentary composite part 350 and the first uncured composite part 310 in operation 930, and removing the reformable mandrel 100 in operation 940. Method 900 can further include reforming the reformable mandrel 100 in operation 950.

The reformable mandrel 100 can include a core 110 comprising a transitional state material having a transition temperature, and a sleeve 120 at least partially surrounding the core 110 and comprising a heat-resistant flexible material having an operational temperature.

The core 110 of the reformable mandrel 100 can be configured to maintain a rigid state below the transition temperature and a flexible state above the transition temperature, and the operational temperature of the sleeve is higher than the transition temperature of the core 110. The sleeve 120 does not deform at or below the operational temperature and the sleeve 120 can be configured to provide sufficient support to the first uncured composite part 310 placed on the reformable mandrel 100.

The operational temperature of the sleeve 120 is higher than a curing temperature for the first uncured composite part 310 placed on the reformable mandrel 100 and/or the complimentary composite part 350, and the sleeve 120 does not deform at or below the curing temperature.

Placing the reformable mandrel 100 on the complimentary composite part 350 in operation 910 can include contouring the reformable mandrel 100 and placing the contoured reformable mandrel 100 on the complimentary composite part 350.

Figure 15:
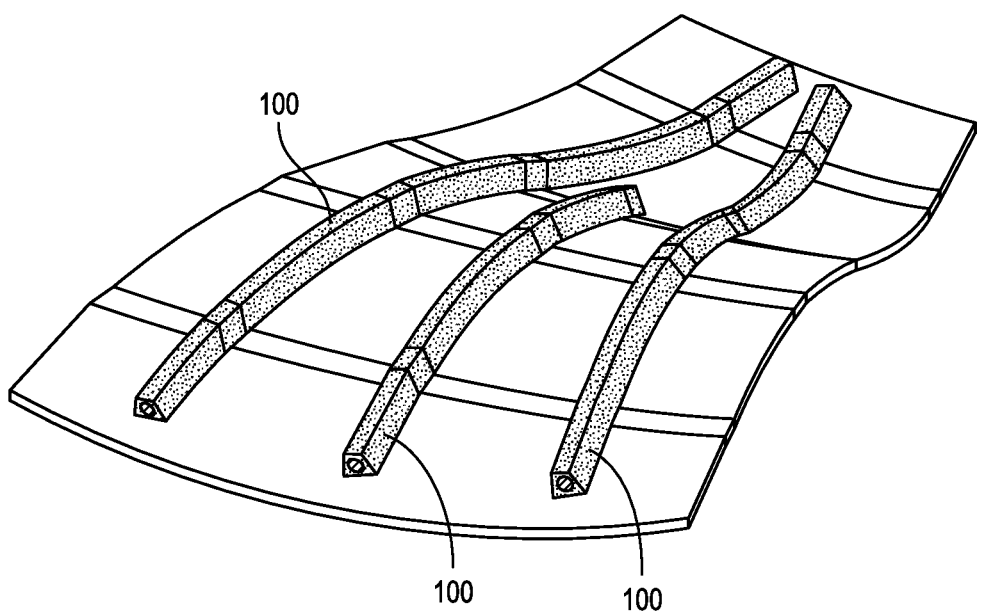
Figure 16:
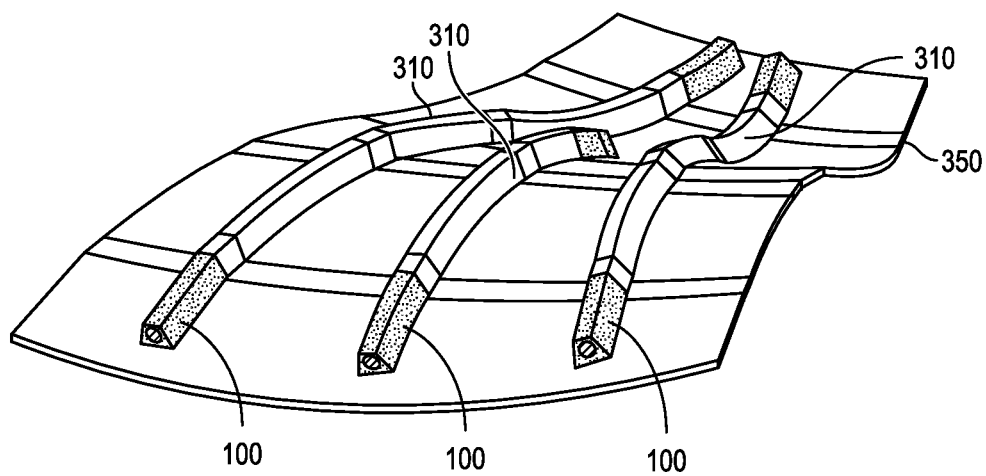

As illustrated in FIGS. 15-16, the complimentary composite part 350 can be embodied as a contoured skin panel. The complimentary composite part 350 can be at least partially cured to maintain a contoured shape. In other implementations, the complimentary composite part 350 is fully cured in order to maintain a contoured shape. Alternatively, the complimentary composite part 350 can be supported by a base configured to maintain a contoured shape of the complimentary composite part 350.

Contouring the reformable mandrel 100 can include contouring the reformable mandrel 100 to reflect the contour of the complimentary composite part 350, similar as described above with respect to FIG. 8.

As illustrated in FIG. 15, after the reformable mandrel 100 is contoured and cooled to transition to a rigid state, the reformable mandrel 100 can be placed on the complimentary composite part 350. One or more reformable mandrels 100 can be placed on the complimentary composite part 350, depending on the support requirements of the combined composite part 550.

As illustrated in FIG. 15, the contoured reformable mandrel 100 reflects a shape of the complimentary composite part 350.

As illustrated in FIG. 16, placing the first uncured composite part 310 on the reformable mandrel 100 in operation 920 can include placing one or more plies of composite material on the reformable mandrel 100. The one or more plies of composite material can be placed via hand layup, automated fiber placement (AFP), automated tape layup (ATL), resin infusion, or the like. The reformable mandrel 100 can be in a rigid state during placing of the first uncured composite part 310. Because the reformable mandrel 100 is in a rigid state, the reformable mandrel 100 provides sufficient support to form the composite plies of the first uncured composite part 310 to the shape of the reformable mandrel 100.

Co-curing the complimentary composite part 350 and the first uncured composite part 310 is similar as described above with respect to operation 830. For example, co-curing the complimentary composite part 350 and the first uncured composite part 310 to form a combined composite part 550 in operation 930 can include heating the first uncured composite part 310 to a curing temperature for a predetermined time. In some implementations, the complimentary composite part 350 is already cured. In other implementations, the complimentary composite part 350 is not fully cured, and co-curing the complimentary composite part 350 and the first uncured composite part 310 includes heating the complimentary composite part 350 and the first uncured composite part 310 to a curing temperature for a predetermined time.

Curing complimentary composite part 350 and the first uncured composite part 310 in operation 930 can further include applying a pressure to the complimentary composite part 350 and/or the first uncured composite part 310 for a predetermined time. Accordingly, co-curing the complimentary composite part 350 and the first uncured composite part 310 can include at least one of heating the complimentary composite part 350 and the first uncured composite part 310 to a curing temperature for a predetermined time, and/or applying a pressure to the complimentary composite part 350 and/or the first uncured composite part 310 for a predetermined time.

As described above, the curing temperature is higher than the transition temperature of a core 110 of the reformable mandrel 100, such that, the reformable mandrel 100 becomes flexible during co-curing of the complimentary composite part 350 and the first uncured composite part 310 and layup of the first uncured composite part 310 on the reformable mandrel 100 is enhanced and good compaction is provided.

Figure 17:
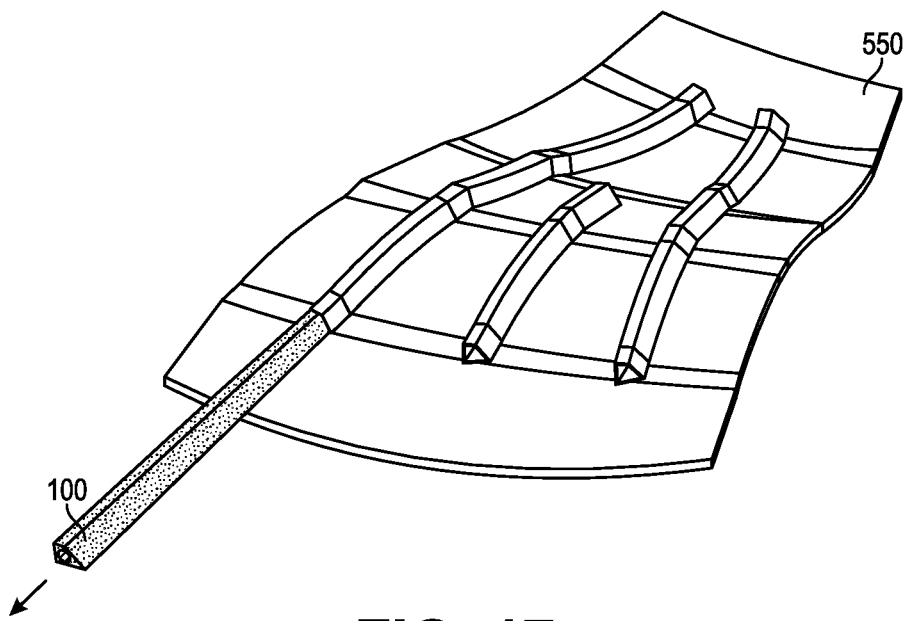
Figure 18:
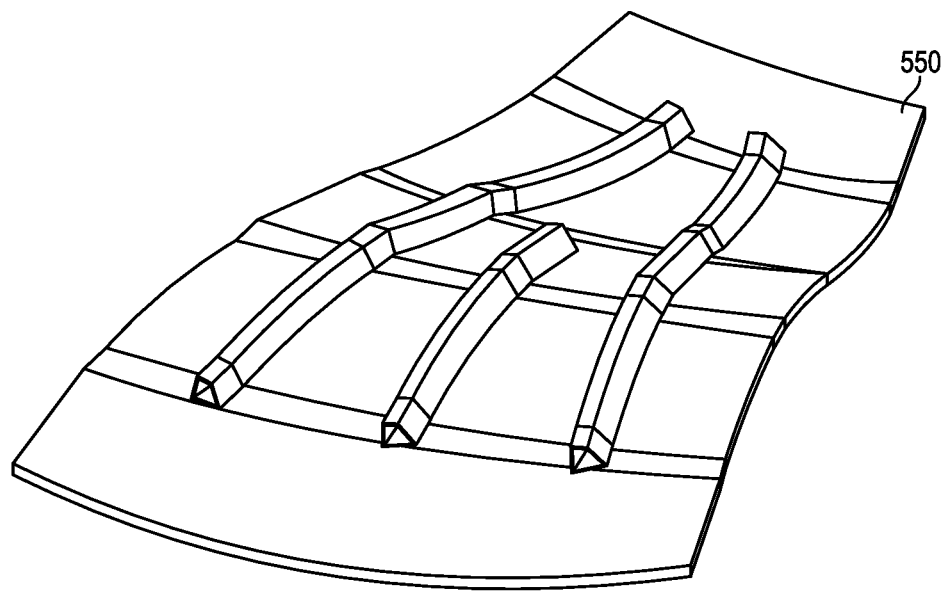

Removing the reformable mandrel 100 in operation 940 can include removing the reformable mandrel 100 from the combined composite part 550 while the core 110 of the reformable mandrel 100 is in a flexible state, similar as described above with respect to operation 850. For example, as illustrated in FIG. 17, the reformable mandrel 100 can remain above the transition temperature after co-curing of the complimentary composite part 350 and the first uncured composite part 310, such that the core 110 of the reformable mandrel 100 is in a flexible state as it is removed from the first uncured composite part 310. The reformable mandrel 100 can be deformed as it is removed from the combined composite part 550. Removing the reformable mandrel 100 further includes non-destructively removing the reformable mandrel 100 from the combined composite part 550. As illustrated in FIG. 17, the reformable mandrel 100 can be removed by pulling it straight out of the combined composite part 550 without damage to either the reformable mandrel 100 or the combined composite part 550, as the reformable mandrel 100 is sufficiently flexible to deform during removal. Accordingly, the reformable mandrel 100 can be deformed non-destructively as it is removed from the combined composite part 550, and, as illustrated in FIG. 18, a combined composite part 550 remains after removal of the reformable mandrel 100.

After the reformable mandrel 100 is removed from the combined composite part 550, the reformable mandrel 100 can be reformed for reuse or transportation and storage. The core 110 of the reformable mandrel 100 may still be in a flexible state after removal from the combined composite part 550, or the core 110 of the reformable mandrel 100 may be heated above the transition temperature after removal from the combined composite part 550 to place it again in a flexible state.

Reforming the reformable mandrel 100 in operation 950 can include placing the reformable mandrel 100 on a contouring tool 200, cooling the reformable mandrel 100, and removing the reformable mandrel 100 from the contouring tool 200. Operation 950 can further include conforming the reformable mandrel 100 to a contour of the contouring tool 200 and removing the reformable mandrel 100 from the contouring tool 200. Reforming the reformable mandrel in operation 950 is similar to contouring the reformable mandrel 100 in operation 810 and reforming the reformable mandrel 100 in operation 850.

Figure 19:
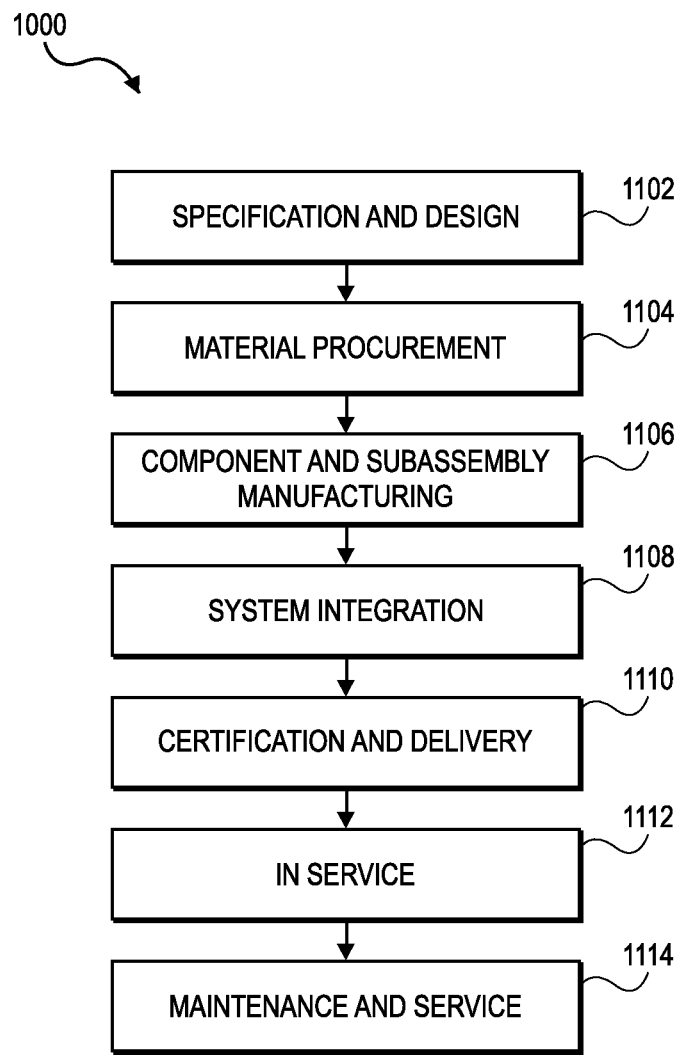
FIG. 19 illustrates a flow diagram of aircraft production and service methodology.
Figure 20:
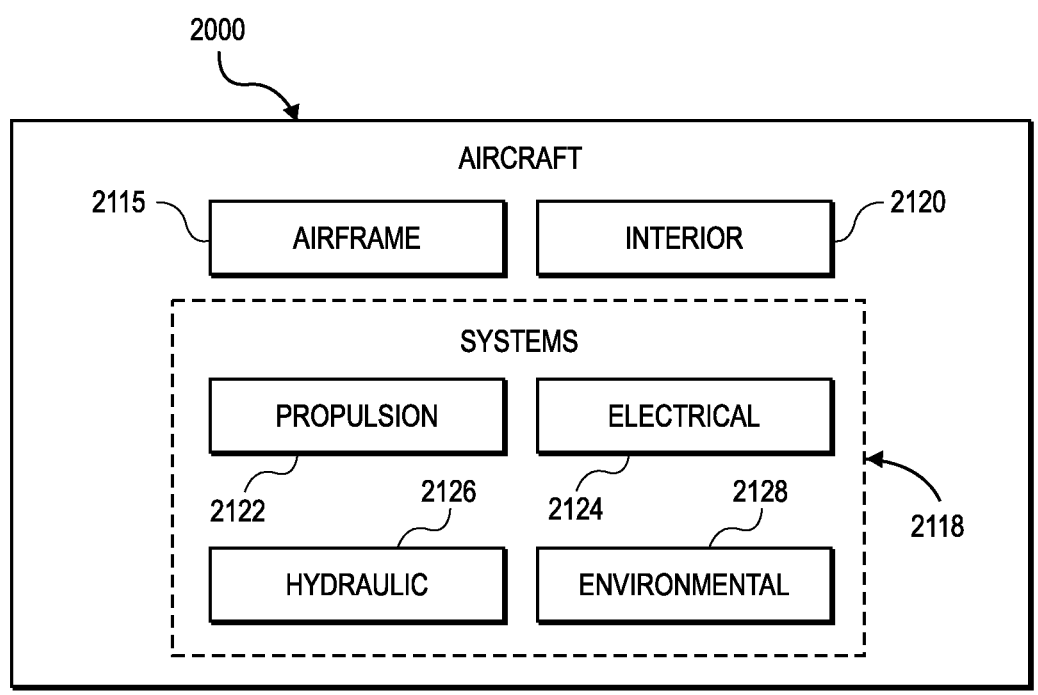
FIG. 20 illustrates a block diagram of an aircraft.

Implementations of the present disclosure may find use in a variety of potential applications, particularly in the transportation industry, including for example, aerospace, marine, rail, automotive applications, and other application where resin-infused composite structures are desired. However, the present disclosure is not limited thereto, and implementations of the present disclosure may be used in applications outside the transportation industry. Thus, referring now to FIGS. 19 and 20, implementations of the disclosure may be used in the context of an aircraft manufacturing and service method 1000 as shown in FIG. 19 and an aircraft 2000 as shown in FIG. 20. While FIG. 20 is described in terms of an aircraft 2000, the present disclosure is not limited thereto, and the service method 1000 can be applied to other structures. During pre-production, exemplary method 1000 may include specification and design 1102 of the aircraft 2000 and material procurement 1104. During production, component and subassembly manufacturing 1106 and system integration 1108 of the aircraft 2000 takes place. Thereafter, the aircraft 2000 may go through certification and delivery 1110 in order to be placed in service 1112. While in service by a customer, the aircraft 2000 is scheduled for routine maintenance and service 1114, which may also include modification, reconfiguration, refurbishment, and so on.

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 20, the aircraft 2000 produced by exemplary method 1000 may include an airframe 2115 with a plurality of systems 2118 and an interior 2120. Examples of systems 2118 include one or more of a propulsion system 2122, an electrical system 2124, a hydraulic system 2126, and an environmental system 2128. Any number of other systems may be included. Although an aerospace example is shown, the principles of the disclosure may be applied to other industries, such as the marine and automotive industries.

Systems and methods exemplified herein may be employed during any one or more of the stages of the aircraft manufacturing and service method 1000. For example, components or subassemblies corresponding to component and subassembly manufacturing 1106 may be fabricated or manufactured in a manner similar to components or subassemblies produced while the aircraft 2000 is in service. Also, one or more apparatus examples, method examples, or a combination thereof may be utilized during the component and subassembly manufacturing 1106 and system integration 1108, for example, by substantially expediting assembly of or reducing the cost of an aircraft 2000. Similarly, one or more of apparatus examples, method examples, or a combination thereof may be utilized while the aircraft 2000 is in service, for example and without limitation, to maintenance and service 1114.

While FIGS. 19 and 20 describe the disclosure with respect to aircraft and aircraft manufacturing and servicing, the present disclosure is not limited thereto. The systems and methods of the present disclosure may also be used for spacecraft, satellites, rotorcraft, submarines, surface ships, automobiles, autonomous vehicles, tanks, trucks, power plants, railway cars, and any other suitable type of objects.

The present disclosure has been described with reference to exemplary implementations. Although a few implementations have been shown and described, it will be appreciated by those skilled in the art that changes can be made in these implementations without departing from the principles and spirit of preceding detailed description. It is intended that the present disclosure be construed as including all such modifications and alterations insofar as they come within the scope of the appended claims or the equivalents thereof.

What is claimed is:

1. A method for making a composite part using a reformable mandrel, comprising:

heating the reformable mandrel to a temperature above a transition temperature such that the reformable mandrel is in a flexible state and contouring the reformable mandrel while the reformable mandrel is in said flexible state;

cooling the reformable mandrel to a temperature below the transition temperature such that the reformable mandrel is in a rigid state;

placing an uncured composite part on the reformable mandrel while the reformable mandrel is in said rigid state to reflect a desired contour of the composite part to be formed;

curing the uncured composite part;

removing the reformable mandrel while the reformable mandrel is above the transition temperature and in a flexible state; and reforming the reformable mandrel for reuse or transportation and storage, wherein reforming the reformable mandrel comprises contouring the reformable mandrel, and cooling the reformable mandrel to a temperature below the transition temperature, and wherein the reformable mandrel comprises:
 a core comprising a transitional state material having the transition temperature, and
 a sleeve at least partially surrounding the core and comprising a heat-resistant flexible material having an operational temperature from 100° F. to 700° F. to maintain its cross-sectional geometry when contouring the reformable mandrel, placing the uncured composite part on the reformable mandrel, and curing the uncured composite part.

2. The method of claim 1, wherein the core of the reformable mandrel is configured to maintain a rigid state below the transition temperature and a flexible state above the transition temperature, wherein the transition temperature of the core is between 100° F. to 300° F. and the operational temperature of the sleeve is higher than the transition temperature of the core, and wherein the sleeve does not deform at or below the operational temperature to support the uncured composite part placed on the reformable mandrel.

3. The method of claim 1, wherein the operational temperature of the sleeve is higher than a curing temperature for the uncured composite part placed on the reformable mandrel, and the sleeve does not deform at or below the curing temperature.

4. The method of claim 3, wherein heating the reformable mandrel to a temperature above a transition temperature and contouring the reformable mandrel comprises:
 heating the core of the reformable mandrel to a temperature above the transition temperature at which the core is in a flexible state;
 placing the reformable mandrel on a contouring tool; and
 cooling the core of the reformable mandrel to a temperature below the transition temperature at which the core is in a rigid state.

5. The method of claim 4, wherein contouring the reformable mandrel further comprises:
 conforming the reformable mandrel to a contour of the contouring tool while at the transition temperature; and
 removing the reformable mandrel from the contouring tool after cooling the core below the transition temperature.

6. The method of claim 3, wherein the uncured composite part comprises two or more complementary uncured composite parts, and wherein contouring the reformable mandrel comprises contouring the reformable mandrel to reflect the contour of a second uncured composite part.

7. The method of claim 3, wherein placing the uncured composite part on the reformable mandrel comprises placing one or more plies of composite material on the reformable mandrel, and
 wherein the core of the reformable mandrel is in a rigid state during placement of the uncured composite part.

8. The method of claim 6, wherein placing an uncured composite part on the reformable mandrel comprises placing a first uncured composite part on the reformable mandrel and placing the reformable mandrel on the second uncured composite part.

9. The method of claim 4, wherein curing the uncured composite part comprises at least one of:
 heating the uncured composite part to the curing temperature for a predetermined time, or
 applying a pressure to the uncured composite part for a predetermined time.

10. The method of claim 9, wherein the core is configured to transition to the flexible state at a temperature above the transition temperature that concurrently causes gradual curing of the uncured composite part.

11. The method of claim 8, wherein curing the uncured composite part comprises co-curing the first uncured composite part and the second uncured composite part to create a combined composite part.

12. The method of claim 3, wherein removing the reformable mandrel comprises removing the reformable mandrel from the cured composite part while the core of the reformable mandrel is in a flexible state.

13. The method of claim 12, wherein the reformable mandrel is deformed non-destructively as it is removed from the cured composite part.

14. The method of claim 11, wherein removing the reformable mandrel comprises removing the reformable mandrel from the first uncured composite part while the reformable mandrel is above the transition temperature at which the core of the reformable mandrel is in a flexible state.

15. The method of claim 3, wherein reforming the reformable mandrel comprises:
 heating the reformable mandrel to a temperature above the transition temperature,
 placing the reformable mandrel on a contouring tool and contouring the reformable mandrel while above the transition temperature,
 cooling the reformable mandrel, and
 removing the reformable mandrel from the contouring tool after cooling the reformable mandrel below the transition temperature.

16. A method for making a combined composite part using a reformable mandrel, comprising:
 heating the reformable mandrel to a temperature above a transition temperature, such that the reformable mandrel is in a flexible state, and contouring the reformable mandrel;
 cooling the reformable mandrel to a temperature below the transition temperature, such that the reformable mandrel is in a rigid state;
 placing the reformable mandrel on a complimentary composite part and then placing a first uncured composite part on the reformable mandrel while the reformable mandrel is in said rigid state to reflect a desired contour of the combined composite part to be formed;

co-curing the complimentary composite part and the first uncured composite part to form a combined composite part;

removing the reformable mandrel while the reformable mandrel is above the transition temperature and in a flexible state; and reforming the reformable mandrel for reuse or transportation and storage, wherein reforming the reformable mandrel comprises contouring the reformable mandrel and cooling the reformable mandrel to a temperature below the transition temperature, and wherein the reformable mandrel comprises:

a core comprising a transitional state material having the transition temperature, and a sleeve at least partially surrounding the core and comprising a heat-resistant flexible material having an operational temperature from 100° F. to 700° F. to maintain its cross-sectional geometry when contouring the reformable mandrel, placing the reformable mandrel on the complimentary composite part and placing the first uncured composite part on the reformable mandrel, and co-curing the complimentary composite part and the first uncured composite part.

17. The method of claim 16, wherein the core of the reformable mandrel is configured to maintain a rigid state below the transition temperature and a flexible state above the transition temperature, the transition temperature of the core is between 100° F. to 300° F. and the operational temperature of the sleeve is higher than the transition temperature of the core, the sleeve does not deform at or below the operational temperature, and the sleeve provides sufficient support to the first uncured composite part placed on the reformable mandrel.

18. The method of claim 17, wherein the operational temperature of the sleeve is higher than a curing temperature for the first uncured composite part placed on the reformable mandrel and the complimentary composite part, and the sleeve does not deform at or below the curing temperature.

19. The method of claim 18, wherein placing the reformable mandrel on the complimentary composite part comprises placing one or more plies of composite material on the contoured reformable mandrel, and placing the contoured reformable mandrel with the one or more plies of composite material on the complimentary composite part.

20. The method of claim 2, wherein the transition temperature of the core is between 150° F. to 160° F.

* * * * *